United States Patent
Koga et al.

(10) Patent No.: US 7,978,772 B2
(45) Date of Patent: Jul. 12, 2011

(54) MULTICARRIER COMMUNICATION APPARATUS, INTEGRATED CIRCUIT, AND MULTICARRIER COMMUNICATION METHOD

(75) Inventors: Hisao Koga, Fukuoka (JP); Nobutaka Kodama, Fukuoka (JP)

(73) Assignee: Panasonic Corporation, Osaka (JP)

( * ) Notice: Subject to any disclaimer, the term of this patent is extended or adjusted under 35 U.S.C. 154(b) by 1249 days.

(21) Appl. No.: 11/478,727

(22) Filed: Jul. 3, 2006

(65) Prior Publication Data

US 2007/0009055 A1   Jan. 11, 2007

(30) Foreign Application Priority Data

Jul. 5, 2005   (JP) .............................. P. 2005-196141

(51) Int. Cl.
H04K 1/10   (2006.01)
(52) U.S. Cl. .................... 375/260; 375/316; 375/326
(58) Field of Classification Search .................. 375/260, 375/316, 349, 326
See application file for complete search history.

(56) References Cited

U.S. PATENT DOCUMENTS

| | | | | |
|---|---|---|---|---|
| 5,497,398 A | * | 3/1996 | Tzannes et al. | |
| 5,631,610 A | * | 5/1997 | Sandberg et al. | |
| 5,636,246 A | * | 6/1997 | Tzannes et al. | |
| 5,737,077 A | * | 4/1998 | Lee et al. | ...................... 356/317 |
| 5,995,539 A | * | 11/1999 | Miller | |
| 6,532,256 B2 | * | 3/2003 | Miller | |
| 6,535,818 B1 | * | 3/2003 | Baeten | ............................. 702/17 |
| 6,549,520 B1 | * | 4/2003 | Gross et al. | |
| 6,944,232 B2 | * | 9/2005 | Koga et al. | |
| 2001/0033612 A1 | * | 10/2001 | Peeters | |
| 2003/0156014 A1 | * | 8/2003 | Kodama et al. | |
| 2004/0057529 A1 | * | 3/2004 | Koga et al. | |
| 2005/0008086 A1 | * | 1/2005 | Koga et al. | |
| 2005/0031048 A1 | * | 2/2005 | Koga et al. | |
| 2005/0037722 A1 | * | 2/2005 | Koga et al. | |
| 2005/0076254 A1 | * | 4/2005 | Robinson et al. | ............. 713/320 |

FOREIGN PATENT DOCUMENTS

| | | | |
|---|---|---|---|
| EP | 0729250 | | 8/1996 |
| EP | 0734132 | | 9/1996 |
| EP | 1065818 | | 1/2001 |
| EP | 1039715 | * | 8/2002 |
| JP | 2000165304 | * | 6/2000 |
| JP | 2000278237 | * | 10/2000 |
| JP | 200194527 | * | 4/2001 |
| JP | 2003218831 | * | 7/2003 |
| JP | 200557644 | * | 3/2005 |
| WO | 9953667 | | 10/1999 |

OTHER PUBLICATIONS

H. Malvar, "Signal Processing with Lapped Transforms," Artech House, Chapter 5, pp. 175-212 with table of contents, 1992.*
M. C. Sun et al., "Power-Line Communications using DWMT Modulation," IEEE, vol. 4, XP002271367, pp. 493-496, May 26-29, 2002.*
International Search Report dated Oct. 9, 2006.

* cited by examiner

Primary Examiner — Chieh M Fan
Assistant Examiner — Leila Malek
(74) Attorney, Agent, or Firm — Dickinson Wright PLLC (57) ABSTRACT

A digital transmission signal from a digital signal processing unit is converted to an analog signal in an analog circuit, and is transmitted from transmission lines via a communication transformer. The digital signal processing unit includes a time carrier detector that detects a carrier by using a time waveform of a reception signal and a frequency carrier detector that detects a carrier by using frequency characteristics of the reception signal. Under the control of a controller, carrier detection is performed by switching between the time carrier detector and the frequency carrier detector for operation.

22 Claims, 8 Drawing Sheets

MULTICARRIER COMMUNICATION APPARATUS, INTEGRATED CIRCUIT, AND MULTICARRIER COMMUNICATION METHOD

BACKGROUND

1. Field of Invention

The present invention relates to a multicarrier communication apparatus, an integrated circuit, and a multicarrier communication method, in which communication is performed by using a plurality of carriers.

2. Description of Related Art

A transmission method using a plurality of subcarriers, such as an OFDM (Orthogonal Frequency Division Multiplexing) method, has a major advantage that high quality communication is possible even when the communication is performed through a rough transmission line, and has been used for not only wireless communication but also wired communication such as power line communication.

A multicarrier communication apparatus, which performs such communication using a plurality of subcarriers, transmits bit data, which are to be transmitted, on a transmitting side by converting the bit data to symbol data; performing a symbol mapping according to the symbol data; converting the data to time-axis data via an inverse FFT transform or an inverse wavelet transform; performing a parallel-serial transform; and converting the data to a base-band analog signal via a DA conversion. The multicarrier communication apparatus obtains reception bit data on a receiving side by converting a received signal to a digital signal via an AD conversion; performing a serial-parallel transform; converting the data to frequency-axis data via an FFT transform or a wavelet transform; and performing a demapping.

Such multicarrier communication apparatus has a carrier detection function that determines whether another apparatus is transmitting a signal to a transmission line, and performs a transmission process when another apparatus is not using the transmission line and when a transmission request is received.

Carrier detection of the multicarrier communication apparatus, as shown in Related Art 1 (Japanese Laid-Open Patent Publication 2001-94527), for example, is performed based on an AD converted reception signal. As shown in Related Art 2 (U.S. 20050037722A1), carrier detection may also be performed based on a signal obtained by converting AD converted digital data to frequency-axis data.

In the case where carrier detection is performed based on an AD converted reception signal, correlation of a signal in a time domain is used, and carrier detection can be realized generally by using a simple circuit or by performing a simple data processing process. However, noise which has a correlation in a time waveform can be falsely detected as indicating existence of a carrier. On the other hand, carrier detection based on a signal after being converted to frequency-axis data uses correlation between subcarriers in a frequency domain, and therefore has a high detection accuracy. However, since transform (e.g., FFT, Wavelet Transform) of a received signal from a time domain to a frequency domain is always required, an increase in power consumption is unavoidable.

SUMMARY

Some embodiments described hereinafter address the above-described problems. A purpose of these embodiments is to provide a multicarrier communication apparatus, an integrated circuit, and a multicarrier communication method, which are capable of efficiently performing high-accuracy carrier detection with low power consumption.

The multicarrier communication apparatus is a multicarrier communication apparatus that receives a reception signal and detects a carrier of the reception signal, and includes a first carrier detector that detects the carrier based on first characteristics of the reception signal; a second carrier detector that detects the carrier based on second characteristics of the reception signal; and a controller that selects one of the first carrier detector and the second carrier detector. According to the multicarrier communication apparatus, efficient and high-accuracy carrier detection can be performed with low power consumption.

The multicarrier communication apparatus is a multicarrier communication apparatus that receives a reception signal and detects a carrier of the reception signal, the multicarrier communication comprising, and includes a detector that has first function detecting the carrier based on first characteristics of the reception signal and second function detecting the carrier based on second characteristics of the reception signal, and selects one of first function and the second function. According to the multicarrier communication apparatus, efficient and high-accuracy carrier detection can be performed with low power consumption.

The integrated circuit is an integrated circuit that receives a reception signal and detects a carrier of the reception signal, the integrated circuit comprising, and includes a first carrier detector that detects the carrier based on first characteristics of the reception signal; a second carrier detector that detects the carrier based on second characteristics of the reception signal; and a controller that selects one carrier detector of the first carrier detector and the second carrier detector. According to the integrated circuit, efficient and high-accuracy carrier detection can be performed with low power consumption.

The multicarrier communication method is a multicarrier communication method that receives a reception signal and detects a carrier of the reception signal, the multicarrier communication method comprising, and includes detecting the carrier based on first characteristics of the reception signal; detecting the carrier based on second characteristics of the reception signal; and selecting one carrier detector of the first carrier detector and the second carrier detector. According to the multicarrier communication method, efficient and high-accuracy carrier detection can be performed with low power consumption.

DETAILED DESCRIPTION

In the following, an embodiment is explained with reference to the drawings.

Figure 1:
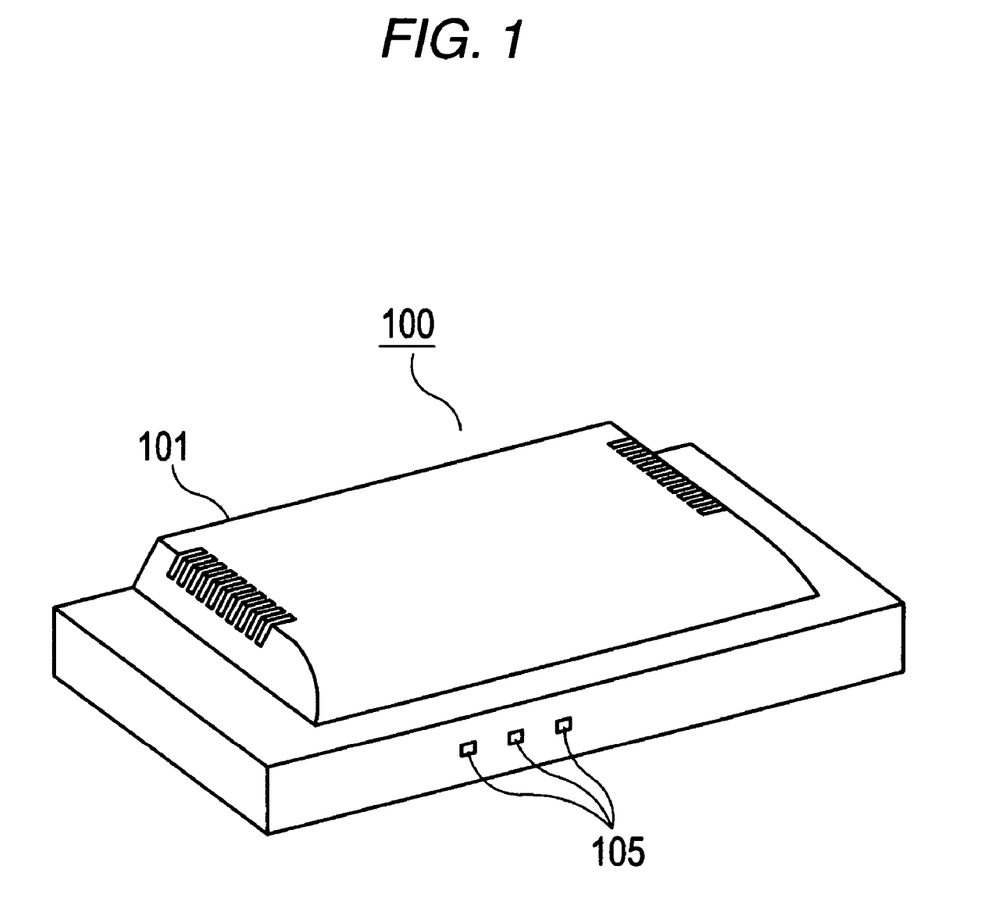
FIG. 1 is an exterior perspective view showing a front side of a multicarrier communication apparatus according to an embodiment.
Figure 2:
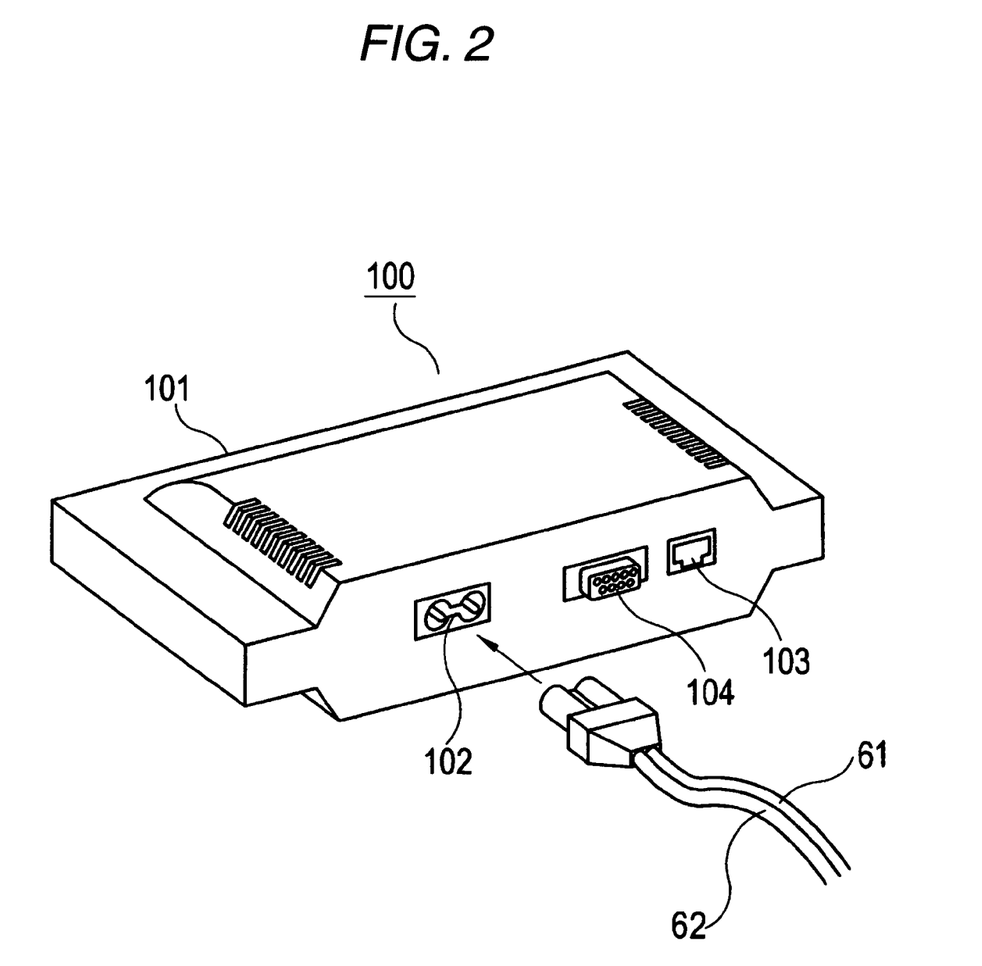
FIG. 2 is an exterior perspective view showing a back side of the multicarrier communication apparatus according to the embodiment.

Malticarrier communication apparatus 100 according to the embodiment is a modem, as shown in FIGS. 1 and 2. Malticarrier communication apparatus 100 has chassis 101. On the front side of chassis 101, as shown in FIG. 1, display 105 having LEDs (Light Emitting Diodes) and the like is provided. On the back side of chassis 101, as shown in FIG. 2, power connector 102, modular jack 103 such as RJ45 or the like for LAN (Local Area Network) connection, and Dsub connector 104 are provided. As shown in FIG. 2, a power line, such as a pair of parallel cables 61 and 62, are connected to power connector 102 (the a pair of parallel cables is referred to as "a power line 61 and 62", hereinafter). A LAN cable, which is not shown in the figure, is connected to modular jack 103. A Dsub cable, which is not shown in the figure, is connected to Dsub connector 104. As an example of the malticarrier communication apparatus, a modem is shown in FIGS. 1 and 2. However, not limited to this specific example, the malticarrier communication apparatus can also be an electrical equipment (for example, a household electrical appliance such as a TV set) equipped with a modem.

Figure 3:
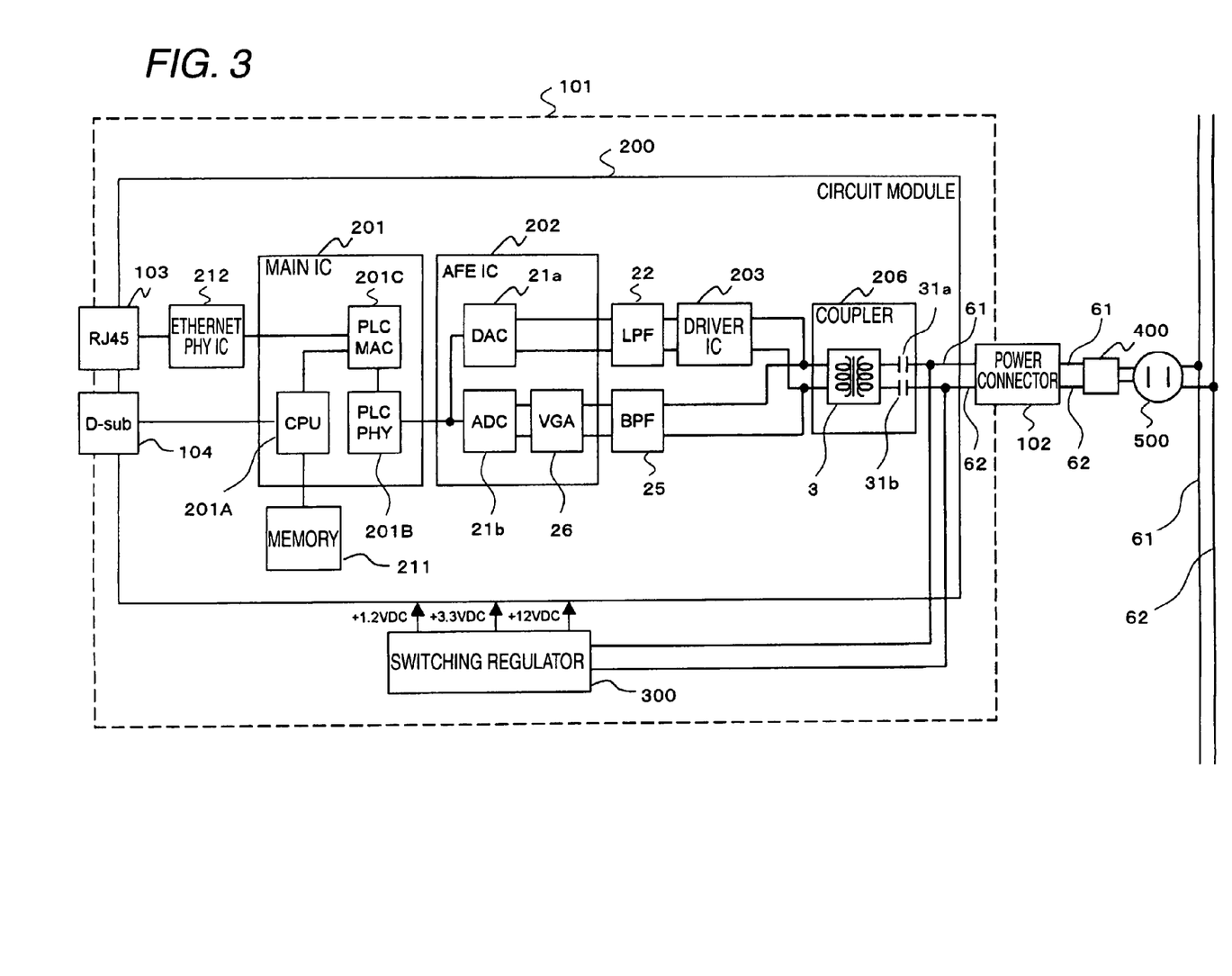
FIG. 3 is a block diagram showing an example of hardware of the multicarrier communication apparatus according to the embodiment.

As FIG. 3 shows, malticarrier communication apparatus 100 has circuit module 200 and switching regulator 300. Switching regulator 300 supplies different voltages (for example, +1.2V, +3.3V, and +12V) to circuit module 200. Circuit module 200 includes main IC (Integrated Circuit) 201, AFE IC (Analog Front End IC) 202, low-pass filter (transmission filter) 22, driver IC 203, coupler 206, band-pass filter (reception filter) 25, memory 211, and Ethernet (registered trademark) PHY IC 212. Power connector 102 is connected to a power line 61 and 62 through plug 400 and outlet 500.

Main IC 201 includes CPU (Central Processing Unit) 201A, PLC MAC (Power Line Communication Media Access Control layer) block 201C and PLC PHY (Power Line Communication Physical layer) block 201B. Main IC 201 is an example of an integrated circuit performing a carrier detection process (to be described later). CPU 201A has a 32-bit RISC (Reduced Instruction Set Computer) processor. PLC MAC block 201C controls a MAC layer for a transmission signal. PLC PHY block 201B controls a PHY layer for a transmission signal. AFE IC 202 includes DA converter (DAC) 21a, AD converter (ADC) 21b, and variable gain amplifier (VGA) 26. Coupler 206 includes coil transformer 3 and coupling capacitors 31a and 31b.

Figure 4:
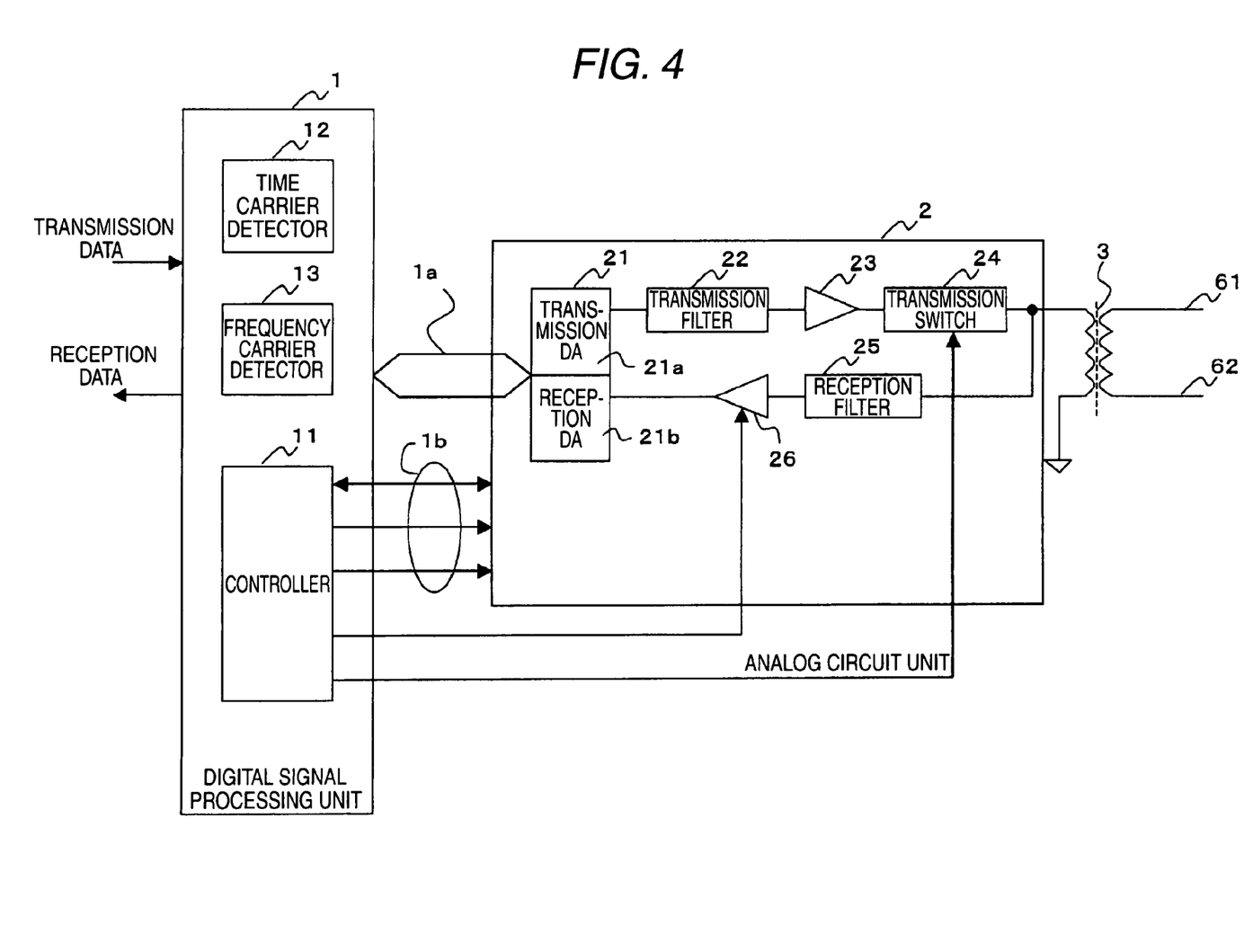
FIG. 4 shows a schematic configuration of a multicarrier communication apparatus according to the embodiment.

The malticarrier communication apparatus of FIG. 4 performs communication via a transmission line including a power line 61 and 62. The malticarrier communication apparatus of FIG. 4 includes digital signal processing unit 1, analog circuit unit 2, and communication transformer 3.

Digital signal processing unit 1, which includes, for example, one digital LSI or a plurality of digital LSIs, generates a digital transmission signal by modulating digital transmitted data, and generates digital received data by demodulating a digital reception signal. Digital signal processing unit 1 also performs control over a signal path, a gain and the like for each unit of analog circuit unit 2. Analog circuit unit 2 includes an analog chip and a discrete component. Digital transmission signal 1a is transmitted to AD/DA conversion circuit 21 of analog circuit unit 2. Digital reception signal 1a is input from AD/DA conversion circuit 21. Control and status signals 1b are also input to or output from analog circuit unit 2. A modulation or demodulation process of digital signal processing unit 1 uses a plurality of subcarriers, such as OFDM (Orthogonal Frequency Division Multiplexing) using a wavelet transform. The wavelet transform of communication generally includes a cosine modulation filter bank.

Digital signal processing unit 1 corresponds to PLC PHY block 201B of main IC 201 shown in FIG. 3. Analog circuit unit 2 corresponds to AFE IC 202, low-pass filter (transmission filter) 22, driver IC 203, and band-pass filter (reception filter) 25 shown in FIG. 3.

Digital signal processing unit 1 includes time carrier detector 12, frequency carrier detector 13, and controller 11. Time carrier detector 12 detects a carrier by using a time waveform of a reception signal. Frequency carrier detector 13 detects carrier by using frequency characteristics of a reception signal. Controller 11 performs control of the entire malticarrier communication apparatus including carrier detection control for switching between time carrier detector 12 and frequency carrier detector 13 for activation.

Detection of a carrier by using a time waveform of a reception signal involves obtaining correlation of a time waveform. Specifically, controller 11 obtains correlation for a shape of a time waveform, and determines that there is a correlation when a correlation peak (which is "1" for an identical shape of a waveform) is above a predetermined value (for example, "0.7"). "Correlation" in these embodiments means relation between a reception signal and another reception signal or predetermined data stored in malticarrier communication apparatus. The relation includes time relation based time characteristics (for example, shape of a time waveform ), frequency relation based on frequency characteristics, and phase relation. "Correlation peak" in these embodiments means value indicating degree of the correlation.

Figure 5:
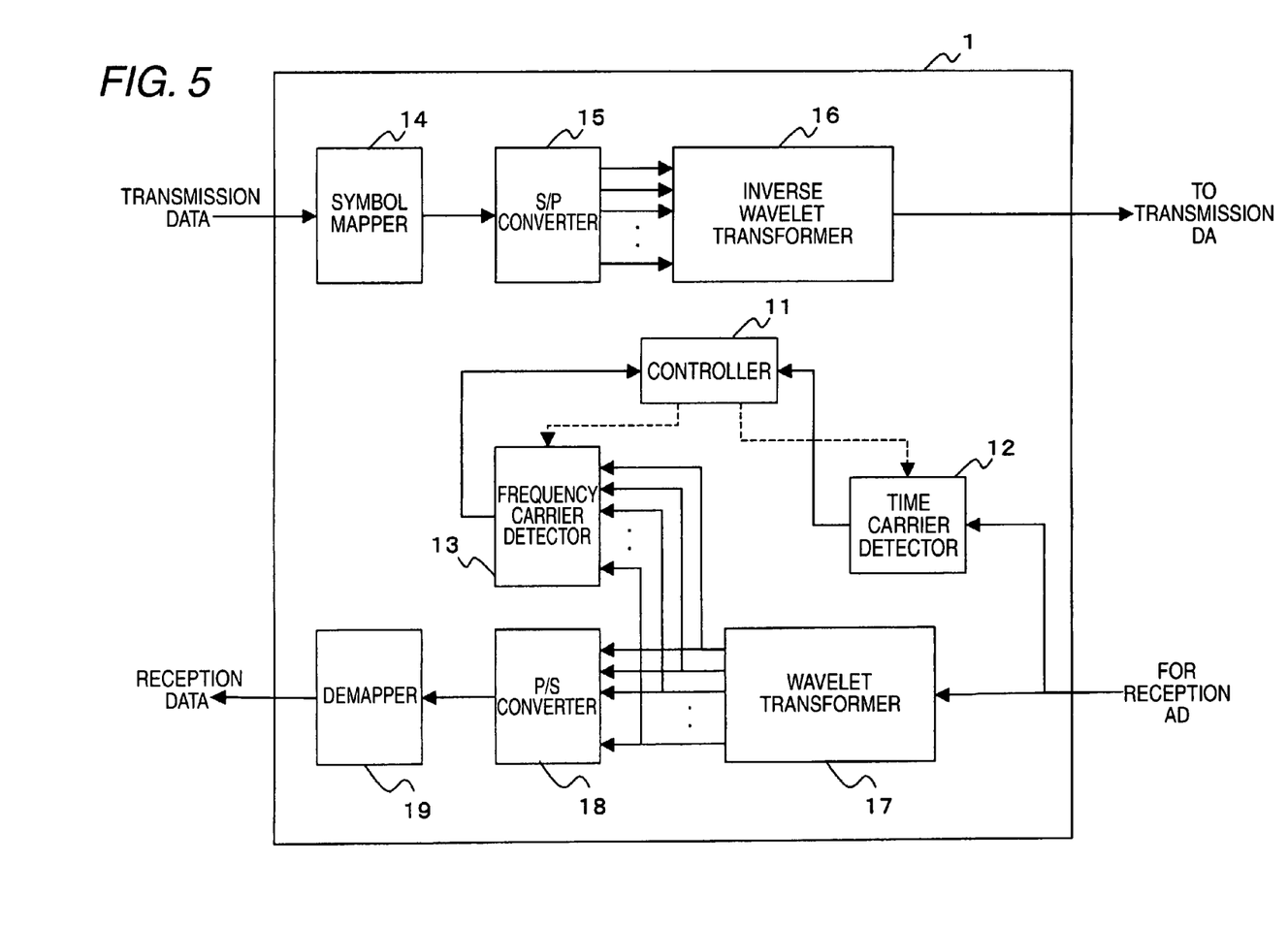
FIG. 5 shows a schematic configuration of a digital signal processing unit of the multicarrier communication apparatus according to the embodiment.

As shown in FIG. 5, in addition to controller 11, time carrier detector 12 and frequency carrier detector 13, digital signal processing unit 1 includes symbol mapper 14, serial-parallel converter (S/P converter) 15, inverse wavelet transformer 16, wavelet transformer 17, parallel-serial converter (P/S converter) 18, and demapper 19.

Symbol mapper 14 converts bit data to be transmitted to symbol data and performs symbol mapping (for example, PAM modulation) according to each symbol data. S/P converter 15 converts mapped serial data to parallel data. Inverse wavelet transformer 16 transforms parallel data to an inverse wavelet as time-axis data, and generates a sampling value sequence representing a transmission symbol. The data are transmitted to transmission DA converter 21a of analog circuit unit 2.

Wavelet transformer 17 transforms reception digital data obtained from reception AD converter 21b of analog circuit unit 2 (a sampling value sequence sampled at the same sampling rate as transmitted) to a discrete wavelet on a frequency axis. P/S converter 18 converts parallel data on the frequency axis to serial data. Demapper 19 obtains received data by calculating an amplitude for each subcarrier and performing a reception signal determination.

Time carrier detector 12 detects a carrier by using a time waveform of a reception signal obtained from AD/DA conversion circuit 21 of analog circuit unit 2. Specifically, time carrier detector 12 detects a carrier by using a correlation of a signal in a time domain. Since a preamble contained in a transmission frame includes a signal that has a correlation in a time domain (for example, "1" for all subcarriers being used), time carrier detector 12 performs carrier detection by using the preamble, and determines existence of a carrier when there is a correlation.

Frequency carrier detector 13 detects a carrier by using frequency characteristics of a reception signal obtained from wavelet transformer 17. Specifically, frequency carrier detector 13 detects a carrier by obtaining complex data of each subcarrier and using a correlation between a plurality of adjacent subcarriers. In the case of using a filter bank of a real coefficient, such as a wavelet, frequency carrier detector 13 uses two subcarriers to form a complex subcarrier and obtains a correlation between the subcarriers. In other words, frequency carrier detector 13 performs a phase difference comparison between adjacent subcarriers, and determines that there is a correlation when a correlation peak is above a predetermined value. Frequency carrier detector 13 may also perform the determination including an amplitude. Also in both cases, frequency carrier detector 13 detects a carrier by using a preamble contained in a transmission frame.

Controller 11 performs control over operations of the entire malticarrier communication apparatus, including carrier detection control for switching between time carrier detector 12 and frequency carrier detector 13 for operation. The carrier detection control will be described later. Since correlation calculation involved in both time carrier detector 12 and frequency carrier detector 13 can be performed by using appropriate hardware or software, its explanation is omitted.

Analog circuit unit 2 includes AD/DA conversion circuit 21, transmission filter 22, transmission amplifier 23, transmission switch 24, reception filter 25, and reception AGC (Auto Gain Control) amplifier 26.

AD/DA conversion circuit 21 includes transmission DA converter 21a and reception AD converter 21b. Transmission DA converter 21a converts digital transmission signal 1a from digital signal processing unit 1 to an analog transmission signal. Reception AD converter 21b converts an analog reception signal from reception AGC amplifier 26 to a digital reception signal. Transmission filter 22 is a low-pass filter for eliminating high frequency noise generated by the DA conversion of transmission DA converter 21a. Transmission amplifier 23 amplifies transmission power of an analog transmission signal. Transmission switch 24, which performs switching of transmission and reception signals, mutes transmission amplifier 23 when receiving, and switches impedances between transmitting and receiving.

Reception filter 25 is a band-pass filter for eliminating noise of frequencies outside a communication band. Reception AGC amplifier 26 amplifies an analog reception signal, and adjusts the analog reception signal to a voltage suited to a resolution of reception AD converter 21b.

Communication transformer 3 performs transmission and reception of signals by insulating communication signals to a primary circuit on the malticarrier communication apparatus side and a secondary circuit on the transmission line side.

The following is a simple overview of operations of the malticarrier communication apparatus shown in FIG. 4. When transmitting a signal, DA converter 21a of AD/DA conversion circuit 21 converts a digital transmission signal generated by digital signal processing unit 1 to an analog signal. The analog signal drives communication transformer 3 via transmission filter 22, transmission amplifier 23 and transmission switch 24, and is output to a power line 61 and 62 on the secondary side of communication transformer 3.

When a signal is received, the reception signal from a power line 61 and 62 is transmitted to reception filter 25 via communication transformer 3. After gain adjustment by reception AGC amplifier 26, reception AD converter 21b of AD/DA conversion circuit 21 converts the reception signal to a digital signal, digital signal processing unit 1 converts the digital signal to digital data.

Figure 6:
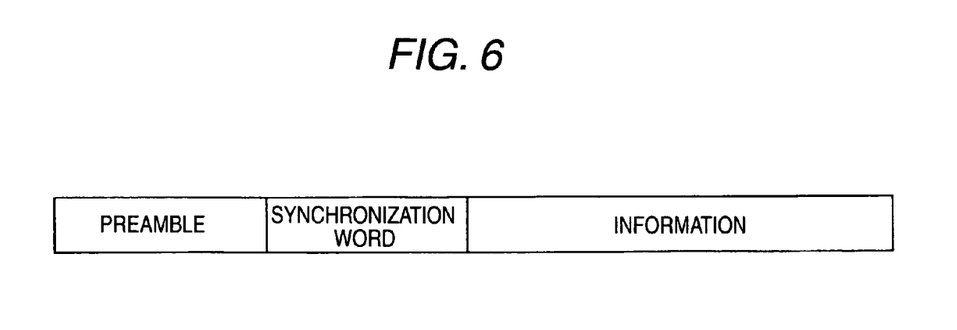
FIG. 6 shows an example of a frame format of transmitted data processed by the multicarrier communication apparatus according to the embodiment.

Next, a carrier detection operation is further explained in detail. The transmitted data include: a preamble for carrier detection, synchronization, equalization and the like; a synchronization word for establishing a synchronization; and information to be transmitted as shown in FIG. 6. As described above, the carrier detection involves switching between time carrier detector 12 and frequency carrier detector 13 for oprreration and using the preamble and synchronization word contained in the frame. Since the preamble and synchronization word respectively have a continuous data (for example "1, 1, 1, . . . , 1"), the preamble and synchronization word enable simple determination of a correlation of a time waveform and a correlation between complex subcarriers. Controller 11 controls the switching of the carrier detection according to a status of a transmission line, according to a content of information to be transmitted (transmission content) that shows a property of data such as voice data, text data, image data and the like, or according to a connecting appliance which is connected to the multicarrier communication apparatus and utilizes a reception signal. For example, in the case where a connecting appliance connected to a malticarrier communication apparatus or a connecting appliance having a built-in malticarrier communication apparatus requires relatively large power consumption, such as an air conditioner, a refrigerator and the like, connecting appliances are identified by using identification information capable of distinguishing one from other connecting appliances. As a result of the identification, in the case where a connecting appliance requires relatively large power consumption, time carrier detector 12 performs a time carrier detection, thereby preventing an increase in power consumption due to the operation of the connecting appliance which requires large power consumption.

(Switching According to Transmission Line Status)

In the case where controller 11 switches between time carrier detector 12 and frequency carrier detector 13 according to a status of a transmission line, the switching may be performed by detecting or estimating the status of the transmission line in advance, or by estimating a status of the transmission line based on the accuracy of carrier detection and the like during communication.

(Detection or Estimation Before Communication)

Figure 7:
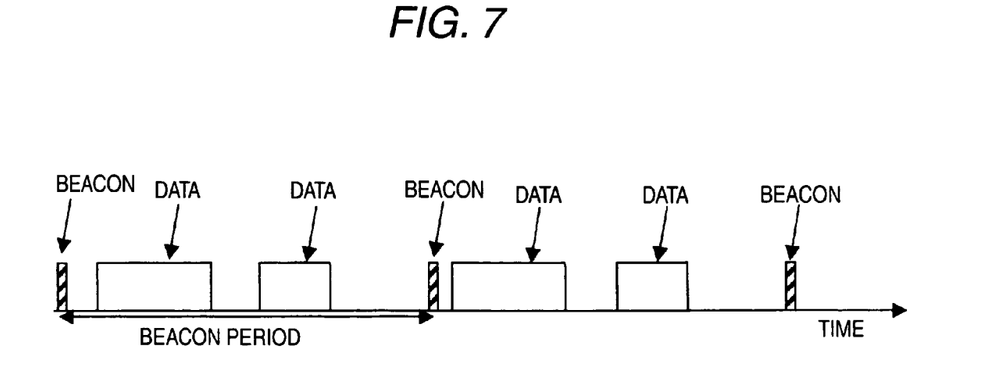
FIG. 7 shows an example of a time chart when the multicarrier communication apparatus according to the embodiment performs communication by using a beacon signal.

As shown in FIG. 7, in the case where a beacon signal is periodically transmitted (between a base unit and a remote unit or between remote units), controller 11 calculates a carrier detection rate of the beacon signal, and selects one of time carrier detector 12 and frequency carrier detector 13. Specifically, based on results of detecting a carrier in the received beacon signal by using time carrier detector 12 and frequency carrier detector 13, controller 11 operates the selected carrier detector out of time carrier detector 12 and frequency carrier detector 13. In other words, when the detection rate is above a predetermined value, which indicates a good transmission line status, controller 11 operates time carrier detector 12, while when the detection rate is below the predetermined value, controller 11 operates frequency carrier detector 13.

It is also possible to calculate a carrier detection rate in a test data, instead of a beacon signal, transmitted from a remote unit to a base unit, and to select one of time carrier detector 12 and frequency carrier detector 13 to operate, based on the result of the calculation.

(Detection or Estimation During Communication)

Controller 11 determines a status of a transmission line during communication, for example, by calculating a CNR (Carrier to Noise Ratio) for each subcarrier. Or, as a measure of the status of the transmission line, a CNR and an can be used. SNR (Signal to Noise Ratio), CINR (Carrier to Interference Noise Ratio) can be used instead of CNR. Specifically, controller 11 calculates a CNR after equalization. In the case where time carrier detector 12 or frequency carrier detector 13 does not performs carrier detection in a correct timing, the CNR characteristics degrades. Therefore, in the case where the CNR degrades, controller 11 switches to frequency carrier detector 13. For example, when a test signal is received, controller 11 performs an equalization process by switching between time carrier detector 12 and frequency carrier detector 13 for operation, calculates a CNR of each subcarrier in each case. In the case where a CNR calculated by using time carrier detector 12 degrades, controller 11 operates frequency carrier detector 13.

Therefore carrier detection can be switched without directly calculating the status of the transmission line. For example, at beginning of communication, time carrier detector 12 operates, and in the case where time carrier detector 12 has failed carrier detection in a predetermined number of times during a certain period of time (for example, in the case where time carrier detector 12 detects noise as a carrier or in the case where time carrier detector 12 detects a carrier but finds a synchronization word), controller 11 operates frequency carrier detector 13 instead. Whether carrier detection by using time carrier detector 12 has failed the predetermined number of times can be determined by simultaneously operating time carrier detection and frequency carrier detection for a certain period of time. Time carrier detector 12 and frequency carrier detector 13 can use a received beacon signal or a received signal of a test data for carrier detection.

(Switching According to Content of Information to be Transmitted)

In the case where the content of information to be transmitted is already known, controller 11 determines, according to the content, whether time carrier detector 12 or frequency carrier detector 13 is to be used. Specifically, in the case where the information to be transmitted is an application that is sensitive to a system delay, such as an AV (audio-visual) signal or a VoIP (Voice over IP) signal, controller 11 operates frequency carrier detector 13. In the case where the information to be transmitted is an application that is not necessarily sensitive to a system delay, such as a data transmission or a control signal, time carrier detector 12 is used.

As describe above, in the case where controller 11 performs switching according to the status of the transmission line, when the status degrades, controller 11 operates frequency carrier detector 13. However, at the beginning of the carrier detection, it is preferable that time carrier detector 12 be operated. In other words, not only when the malticarrier communication apparatus is turned on to operate, but also when the carrier detection operation is performed after the malticarrier communication apparatus has terminated communication with another malticarrier communication apparatus, controller 11 operates time carrier detector 12 first. This is because to operating time carrier detector 12 can reduce power consumption. Further, to perform such operation reduces the necessity to determine a condition for switching from frequency carrier detector 13 to time carrier detector 12. However, in the case where frequent switching from time carrier detector 12 to frequency carrier detector 13 is to be reduced, it is only necessary to activate time carrier detector 12 for a predetermined period of time when the frequency of switching is high. By performing such switching, it is possible to perform a carrier detection that is efficient and of low power consumption even when fluctuation of the status of a transmission line, such as a power line, is large.

Figure 8:
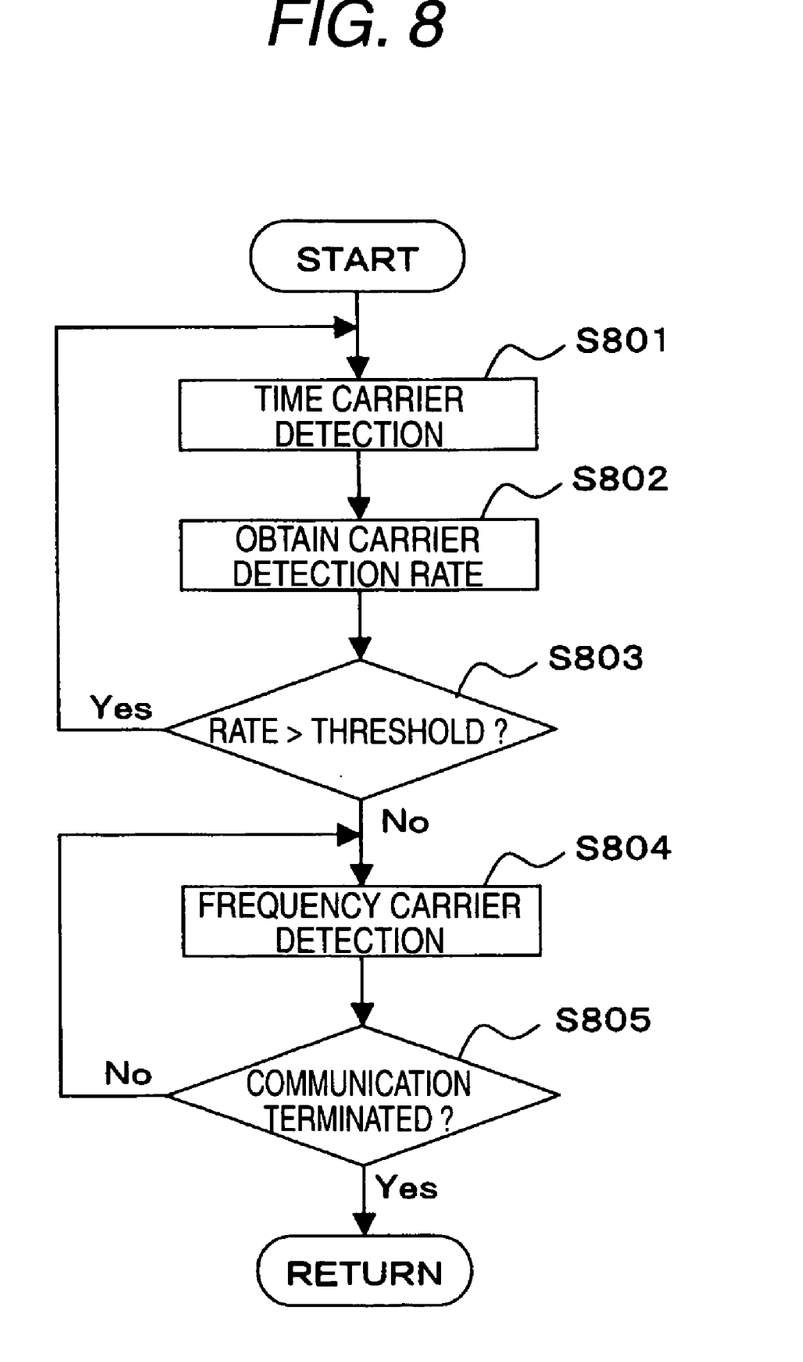
FIG. 8 shows an example of a carrier detection operation flow of the multicarrier communication apparatus according to the embodiment.

FIG. 8 shows an operation flow for the case where controller 11 operates time carrier detector 12 first, and controller 11 operates frequency carrier detector 13 when the status of the transmission line degrades.

At the beginning of a carrier detection operation in an initial stage of an operation of a malticarrier communication apparatus or after a communication operation with another malticarrier communication apparatus, first, time carrier detector 12 performs a time carrier detection (step S801). Next, in step S802, time carrier detector 12 obtains a carrier detection rate. The carrier detection rate is, for example, the rate of successful carrier detection during a predetermined period of time. In step S803, controller 11 determines whether the carrier detection rate is greater than a predetermined threshold. In the case where the carrier detection rate is greater than the predetermined threshold, the process returns to step S801, and time carrier detector 12 repeats the time carrier detection. As the carrier detection rate, it is also possible to use the number of detection failures during a predetermined period of time. In this case, when the number of failures during the predetermined period of time is below a predetermined value, the process returns to step S801, and time carrier detector 12 performs the time carrier detection.

In the case where the carrier detection rate is below the predetermined threshold, controller 11 determines that the status of the transmission line has degraded, and frequency carrier detector 13 performs frequency carrier detection (step S804). Thereafter, until communication with another malticarrier communication apparatus terminates (step S805), frequency carrier detector 13 performs the frequency carrier detection at a predetermined timing.

(Switching According to Appliance Connected to Multicarrier Communication Apparatus)

Controller 11 determines whether time carrier detector 12 or frequency carrier detector 13 is to be used, according to a connecting appliance that connects to the multicarrier communication apparatus and utilizes a reception signal. For example, controller receives from the connecting appliance information, which indicates attribute such as type of the appliance, a manufacturer of the appliance. Specifically, frequency carrier detector 13 is used for an appliance with emphasis on communication performance such as a DVD device, a TV set, an audio device, an IP telephone, while time carrier detector 12 is used for an appliance with emphasis on power consumption. A DVD device, a TV set, an audio device, an IP telephone and the like are examples of appliances with emphasis on communication performance. A refrigerator, an air conditioner and the like are examples of appliances with emphasis on power consumption.

Controller 11 performs at least one of the above-described types of switching. Further, in the case where an error rate of carrier detection by using time carrier detector 12 is high, controller 11 may stop using time carrier detector 12.

Controller 11 can determine whether a carrier detection is in error by the following procedure. When a frame is received, time carrier detector 12 detects a carrier in the preamble upon normal reception, and controller 11 performs synchronization and equalization thereafter. Upon completing preparation for reception, time carrier detector 12 detects a synchronization word, and after a correct detection, controller 11 demodulates actual information. However, since time carrier detector 12 can not detect a synchronization word in the case of a false carrier detection, it is considered as a false detection when a carrier detection was correctly performed but time carrier detector 12 could not detect a synchronization word.

obtains a rate of the false carrier detection for a carrier detection by using time carrier detector 12. When the rate of the false carrier detection is above a predetermined rate, controller 11 stops the carrier detection of time carrier detector 12.

(Combination of Time Carrier Detection and Frequency Carrier Detection)

In the above example, carrier detection is performed based on a detection result of one of time carrier detector 12 and frequency carrier detector 13. It is also possible to perform carrier detection based on detection results of both time carrier detector 12 and frequency carrier detector 13.

Figure 9:
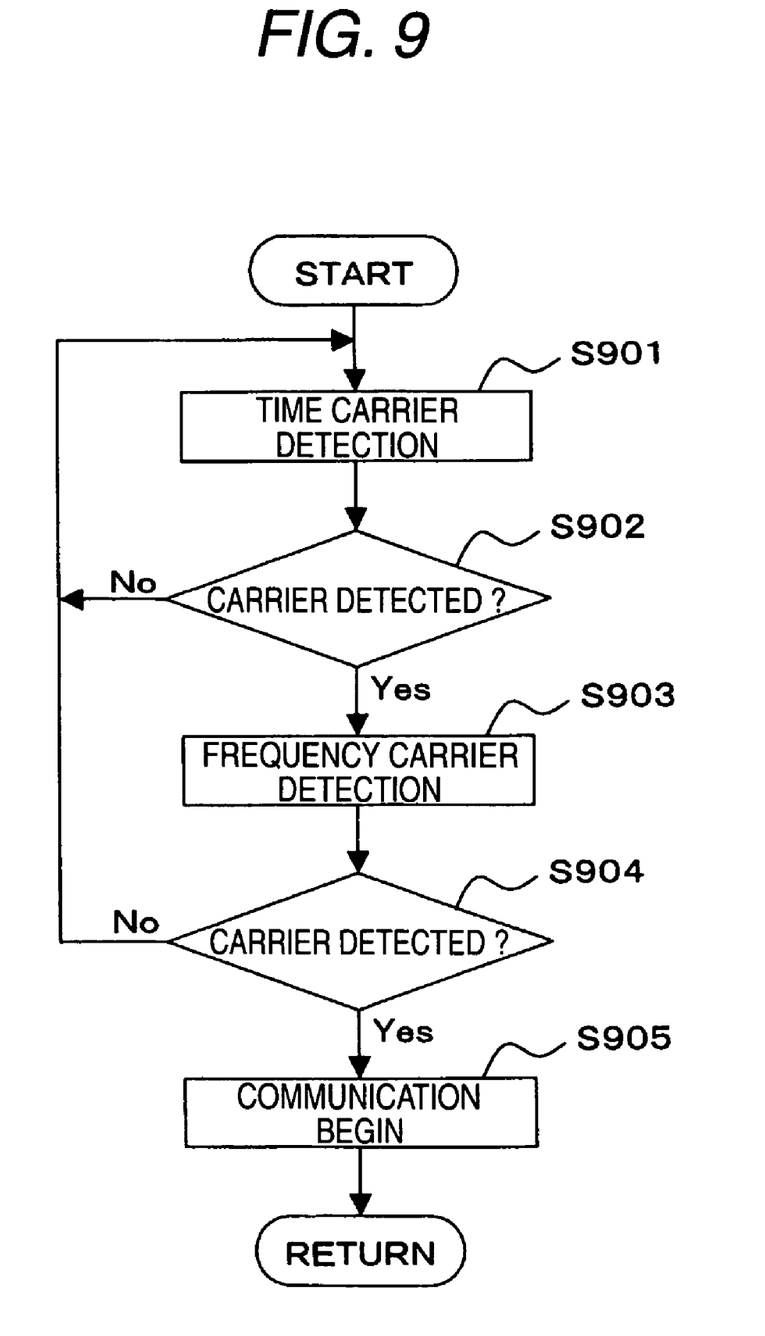
FIG. 9 shows another example of a carrier detection operation flow of the multicarrier communication apparatus according to the embodiment.

To perform a carrier detection, as shown in FIG. 9, time carrier detector 12 operates first, and time carrier detector 12 performs a time carrier detection (step S901). Then, controller 11 determines whether time carrier detector 12 detects a carrier (step S902). The time carrier detection is repeated until time carrier detector 12 detects a carrier.

Upon determining in step S902 that time carrier detector 12 detects a carrier, frequency carrier detector 13 operates and frequency carrier detector 13 performs frequency carrier detection in step S903. Then, controller 11 determines whether frequency carrier detector 13 detects a carrier (step S904). In the case where frequency carrier detector 13 detects a carrier, controller 11 initiates other communication processes (step S905). In the case where controller 11 determines in step S904 that frequency carrier detector 13 does not detect a carrier, the process returns to step S901 and time carrier detector 12 repeats the time carrier detection.

As described above, other communication processes are performed when a carrier is detected by both a time carrier detection and a frequency carrier detection. Therefore, even in the case where a reaction to noise occurs in a time carrier detection, since a frequency carrier detection, which has a high accuracy for the frame, is performed, the number of processes due to false detection can be reduced. Further, when there is no carrier, a time carrier detection is first executed. Therefore, the frequency of frequency carrier detection can be lowered, thereby further reducing power consumption.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2005-196141 filed on Jul. 5, 2005, entire content of which is expressly incorporated by reference herein.

What is claimed is:

1. A multicarrier communication apparatus that receives a reception signal via a transmission line and detects a carrier of the reception signal, the multicarrier communication apparatus comprising:
   a first carrier detector that detects the carrier based on time characteristics of the reception signal;
   a second carrier detector that detects the carrier based on frequency characteristics of the reception signal; and
   a controller that selects, based on status of the transmission line, one of the first carrier detector and the second carrier detector and switches the selected carrier detector between the first carrier detector and the second carrier detector,
   wherein the controller selects the first carrier detector at beginning of communication,
   wherein the controller selects the first carrier detector if the status of the transmission line has a higher quality than a predetermined value and selects the second carrier detector if the status of the transmission line has a lower quality than the predetermined value, and
   wherein the controller switches from the first carrier detector to the second carrier detector in a case where carrier detection by using the first carrier detector has failed.

2. The multicarrier communication apparatus according to claim 1, wherein the transmission line comprises a power line.

3. The multicarrier communication apparatus according to claim 1, wherein the controller switches from the first carrier detector to the second carrier detector in a case where carrier detection of a carrier of a received beacon signal by using the first carrier detector has failed.

4. The multicarrier communication apparatus according to claim 1, wherein the controller switches the selected carrier detector between the first carrier detector and the second carrier detector based on a result of carrier detection of a beacon signal received by one of the time carrier detection and the frequency carrier detection.

5. The multicarrier communication apparatus according to claim 1, wherein the controller switches the selected carrier detector between the first carrier detector and the second carrier detector based on a result of carrier detection of a test signal received by one of the time carrier detection and the frequency carrier detection.

6. The multicarrier communication apparatus according to claim 1, wherein the controller switches the selected carrier detector between the first carrier detector and the second carrier detector based on carrier to noise ratios (CNRs) respectively corresponding to at least one of the plurality of subcarriers.

7. The multicarrier communication apparatus according to claim 1, wherein the controller selects one of the first carrier detector and the second carrier detector after communication terminates.

8. The multicarrier communication apparatus according to claim 1, wherein the controller selects one of the first carrier detector and the second carrier detector according to transmission content.

9. The multicarrier communication apparatus according to claim 1, wherein the controller selects one of the first carrier detector and the second carrier detector according to a connected appliance that utilizes the reception signal.

10. The multicarrier communication apparatus, according to claim 1, wherein the controller selects the first carrier detector, and switches from the first carrier detector to the second carrier detector in a case where a rate of false carrier detection by the first carrier detector is above a predetermined rate.

11. The multicarrier communication apparatus according to claim 1, wherein the controller switches the selected carrier detector between the first carrier detector and the second carrier detector in a case where carrier detection by the first carrier detector has succeeded.

12. The multicarrier communication apparatus according to claim 1, wherein the first carrier detector detects time characteristics of the reception signal by using a correlation of the time waveform.

13. The multicarrier communication apparatus according to claim 12, wherein communication that uses the plurality of carriers uses a wavelet filter bank.

14. A multicarrier communication apparatus that receives a reception signal via a transmission line and detects a carrier of the reception signal, the multicarrier communication comprising:
   a first carrier detector that detects the carrier based on time characteristics of the reception signal;
   a second carrier detector that detects the carrier based on frequency characteristics of the reception signal; and
   a controller that selects, based on status of the transmission line, one of the first carrier detector and the second carrier detector,
   wherein the controller selects the first carrier detector if the status of the transmission line has a higher quality than a predetermined value and selects the second carrier detector if the status of the transmission line has a lower quality than the predetermined value, and
   wherein the second carrier detector detects frequency characteristics of the reception signal by using a correlation between complex subcarriers.

15. The multicarrier communication apparatus according to claim 14, wherein communication that uses the plurality of carriers, uses a wavelet filter bank, and uses two subcarriers to form the complex subcarrier.

16. The multicarrier communication apparatus according to claim 1, wherein the first carrier detector and the second carrier detector detect a carrier by using a signal during a period of time in which a certain amount of data of a received signal have a continuous data.

17. A multicarrier communication apparatus that receives a reception signal via a transmission line and detects a carrier of the reception signal, the multicarrier communication comprising:
   a detector that has a first function detecting the carrier based on time characteristics of the reception signal and a second function detecting the carrier based on frequency characteristics of the reception signal, and selects, based on status of the transmission line, one of the first function and the second function and switches the selected carrier detector between the first function and the second function,
   wherein the detector selects the first function at beginning of communication,
   wherein the detector selects the first function if the status of the transmission line has a higher quality than a predetermined value and selects the second function if the status of the transmission line has a lower quality than the predetermined value, and
   wherein the detector switches from the first function to the second function in a case where carrier detection by using the first function has failed.

18. An integrated circuit that receives a reception signal via a transmission line and detects a carrier of the reception signal, the integrated circuit comprising:
   a first carrier detector that detects the carrier based on time characteristics of the reception signal;
   a second carrier detector that detects the carrier based on frequency characteristics of the reception signal; and
   a controller that selects, based on status of the transmission line, one carrier detector of the first carrier detector and the second carrier detector and switches the selected carrier detector between the first carrier detector and the second carrier detector,
   wherein the detector selects the first carrier detector at beginning of communication,
   wherein the controller selects the first carrier detector if the status of the transmission line has a higher quality than a predetermined value and selects the second carrier detector if the status of the transmission line has a lower quality than the predetermined value, and
   wherein the controller switches from the first carrier detector to the second carrier detector in a case where carrier detection by using the first carrier detector has failed.

19. A multicarrier communication method to receive a reception signal via a transmission line and to detect a carrier of the reception signal, the multicarrier communication method comprising:
   (a) detecting the carrier based on time characteristics of the reception signal;
   (b) detecting the carrier based on frequency characteristics of the reception signal; and
   (c) selecting, based on status of the transmission line, one step of steps (a) and (b), and switching the selected step between step (a) and step (b),
   wherein step (a) is selected at beginning of communication,
   wherein step (a) is selected in step (c) if the status of the transmission line has a higher quality than a predetermined value and step (b) is selected in step (c) if the status of the transmission line has a lower quality than said predetermined value, and
   wherein in step(c) switching is performed from step (a) to step (b) in a case where carrier detection by using step (a) has failed.

20. A multicarrier communication apparatus that receives a reception signal via a transmission line and detects a carrier of the reception signal, the multicarrier communication comprising:
   a detector that has first function detecting the carrier based on time characteristics of the reception signal and second function detecting the carrier based on frequency characteristics of the reception signal, and that selects, based on status of the transmission line, one of the first function and the second function,
   wherein the detector selects the first function if the status of the transmission line has a higher quality than a predetermined value and selects the second function if the status of the transmission line has a lower quality than the predetermined value, and
   wherein the detector detects frequency characteristics of the reception signal by using a correlation between complex subcarriers in the second function.

21. An integrated circuit that receives a reception signal via a transmission line and detects a carrier of the reception signal, the multicarrier communication comprising:
   a first carrier detector that detects the carrier based on time characteristics of the reception signal;

a second carrier detector that detects the carrier based on frequency characteristics of the reception signal; and a controller that selects, based on status of the transmission line, one of the first carrier detector and the second carrier detector;

wherein the controller selects the first carrier detector if the status of the transmission line has a higher quality than a predetermined value and selects the second carrier detector if the status of the transmission line has a lower quality than the predetermined value, and wherein the second carrier detector detects frequency characteristics of the reception signal by using a correlation between complex subcarriers.

22. A multicarrier communication method to receive a reception signal via a transmission line and to detect a carrier of the reception signal, the multicarrier communication method comprising:

(a) detecting the carrier based on time characteristics of the reception signal;

(b) detecting the carrier based on frequency characteristics of the reception signal; and (c) selecting, based on status of the transmission line, one step of steps (a) and (b), wherein step (a) is selected in step (c) if the status of the transmission line has a higher quality than a predetermined value and step (b) is selected in step (c) if the status of the transmission line has a lower quality than the predetermined value, and wherein step (b) includes detecting frequency characteristics of the reception signal by using a correlation between complex subcarriers.

* * * * *